United States Patent [19]

Primdahl

[11] Patent Number: 5,085,950
[45] Date of Patent: Feb. 4, 1992

[54] FUEL CELL

[75] Inventor: Ivar I. Primdahl, Copenhagen, Denmark

[73] Assignee: Haldor Topsoe A/S, Denmark

[21] Appl. No.: 621,862

[22] Filed: Dec. 4, 1990

[30] Foreign Application Priority Data

Dec. 5, 1989 [DK] Denmark .............................. 6121/89

[51] Int. Cl.⁵ .............................................. H01M 8/10
[52] U.S. Cl. .......................................... 429/30; 429/32; 429/38
[58] Field of Search ................... 429/30, 32, 34, 38, 429/12

[56] References Cited

U.S. PATENT DOCUMENTS 4,101,718 7/1978 Tamura et al. ..................... 429/26
4,666,798 5/1987 Herceg .............................. 429/12

Primary Examiner—Anthony Skapars
Attorney, Agent, or Firm—Ostrolenk, Faber, Gerb & Soffen

[57] ABSTRACT

A fuel cell comprising an electrolyte membrane sandwiched between an anode sheet and a cathode sheet, wherein the sheets and the membrane are divided into a number of parallel subareas with inlet and outlet channels for gaseous reactants through the sheets and through the membrane.

7 Claims, 3 Drawing Sheets

FIG.1

|     |     |     |     |     |
|-----|-----|-----|-----|-----|
| 20i | 20a | 20e | 20a | 20i |
| 20a | 40i | 20a | 40e | 20a |
| 20e | 20a | 20i | 20a | 20e |
| 20a | 40e | 20a | 40i | 20a |
| 20i | 20a | 20e | 20a | 20i |
| 1   | 2   | 3   | 4   | 5   |

FIG.2

|     |     |     |     |     |
|-----|-----|-----|-----|-----|
| 20i | 40a | 20e | 40a | 20i |
| 40a | 40i | 40a | 40e | 40a |
| 20e | 40a | 20i | 40a | 20e |
| 40a | 40e | 40a | 40i | 40a |
| 20i | 40a | 20e | 40a | 20i |
| 1   | 2   | 3   | 4   | 5   |

FUEL CELL

The present invention relates to a fuel cell and, in particular, to a fuel cell with diminished passageways for gaseous reactants being transported through the electrode sheets of the fuel cell.

Conventionally designed fuel cells consist of a thin electrolyte matrix sandwiched between a first and second electrode sheet with first and second porous electrode active layers of e.g. platinum, nickel alloys or nickel oxides, which in the fuel cell constitute the anode and the cathode. A first reactant gas consisting of e.g. hydrogen or hydrogen and carbon monoxide, passes over the anode and is absorbed and reacted to the anode surface, while a second reactant gas of oxygen or air passes and reacts over the cathode.

As each fuel cell only produces a voltage of merely about 1 volt, it is necessary to pile and connect many cells to a fuel cell stack in order to obtain voltages for practical purpose.

Fuel cell stacks may contain several hundreds of single cells, each separated by a separator plate, which prevents blending of the reacting gases and which at the same time serves to collect electrical current.

In the fuel cell the cathode sheet and anode sheet are supplied with reactant gas by means of metallic structures disposed between the anode and the cathode.

Fuel process gas and oxidant gas are passed through first and second passages, respectively, formed by the metallic structures, which usually are in form of corrugated sheets. In the known fuel cells connection to the passages is provided at the edge of each electrode, such as the gasses have to traverse the entire cross area of the electrode. Thereby, the first and second passages may be arranged in different directions, usually in counterflow, parallel flow or transvers fashion, and are served by common external manifolds aligned to the cell faces or by conduits arranged at the edge of the cell.

A disadvantage of the known cells is, thereby, the thickness of the used materials, which has to be relatively large in order to provide enough rigidity of the cell structure.

In order to provide sufficient flowareas for gaseous reactants the metallic structures in conventional fuel cells necessarily have a cross-thickness of between 5-10 ml.

Various attempts have been made to reduce the thickness of the metallic structures and the electrode sheets, while still providing enough rigidity of the cell.

The present invention makes use of a principle allowing the metallic structures entirely or partly to be avoided by reducing the distance gaseous reactants have to pass over the electrode sheets to a distance enabling passage through the porous matrix of the electrodes.

In accordance with this principle, an object of the present invention is to provide a fuel cell comprising an electrolyte membrane sandwiched between a first and a second electrode sheet, wherein the first electrode sheet being divided into a number of parallel subareas, in which any second subarea being provided in alternating order with at least an inlet channel and an outlet channel for a first reactant gas through the sheet and with a first electrode active porous layer intermediate to those channels, and any interjacent subarea, in alternating order with at least an inlet channel and at least an outlet channel for a second reactant gas through the sheet and with the first electrode active porous layer intermediate to those channels, the inlet and outlet channels for the second reactant gas being confined against the first electrode active layers by gas impermeable edge-stripes;

the second electrode sheet being divided into a number of parallel subareas in which any second subarea being provided in alternating order with at least an inlet channel and an outlet channel for the first reactant gas through the sheet and with a second electrode active porous layer intermediate to those channels, and any interjacent subarea, in alternating order with at least an inlet channel and at least an outlet channel for the second reactant gas through the sheet and with the second electrode active porous layer intermediate to those channels, the inlet and outlet channels for the first reactant gas being confined against the second electrode active layers by gas impermeable edge-stripes; and the electrolyte membrane being provided with inlet and outlet channels corresponding with compatible channels through the first and second electrode sheet.

Thus, a fuel cell according to the invention comprises the following components:
  an anode sheet
  an electrolyte membrane
  a cathode sheet The electrode active layers may, in a particular embodiment of the invention, be composed of several sublayers, wherein one sublayer has large pores with a pore diameter of preferably more than 10 micrometer, which facilitates the gas transport through the active layer.

The electrolyte membrane consists of one or more layers of porous ceramic material, which in its pore system is able to secure an electrolyte. The membrane may be confined against all gas channels by gas impermeable edge-stripes of e.g. gastight ceramic or metallic materials.

Contrary to the known cells, wherein the metallic structures for transporting gas support ceramic components of the fuel cell only on a part of their areas, the ceramic components of the fuel cell according to the invention are supported evenly all over their entire area by omitting the metallic structures.

As a result problems with different thermic expansion of the metallic structures and the ceramic components are avoided.

The fuel cell according to the invention has thus a greater stability, when transporting the cell, and is more tolerant against gas pressure differences.

As further an advantageous feature of the inventive fuel cell outlet pipe systems for gases can be much easier designed without any risk of short-circuiting the cell by the gas piping systems.

The fuel cell can be constructed with dimensions and for current intensities, which no longer are limited by local gasflow conditions in each cell component.

A number of the fuel cells according to the invention may advantageously be piled to a fuel cell stack with gas inlet and outlet channels arranged vertically through the stack and with electricity conducting, gastight barriers between each cell.

The barriers may suitably be constituted by metallic foils or metallic layers applied on the electrode sheets by e.g. tape casting.

By constructing the fuel cell components as described above the height of construction of a fuel cell stack may be reduced to 1-2 mm per single cell, which is 5 to 10 times less than in the known cell stacks.

Having thus described the general aspects of the invention, the invention will be described in more detail by the following description with reference to the drawings, in which

FIG. 1 shows schematically an anode sheet, and

FIG. 2 shows schematically a cathode sheet for use in a fuel cell according to one embodiment of the invention;

Figure 3:
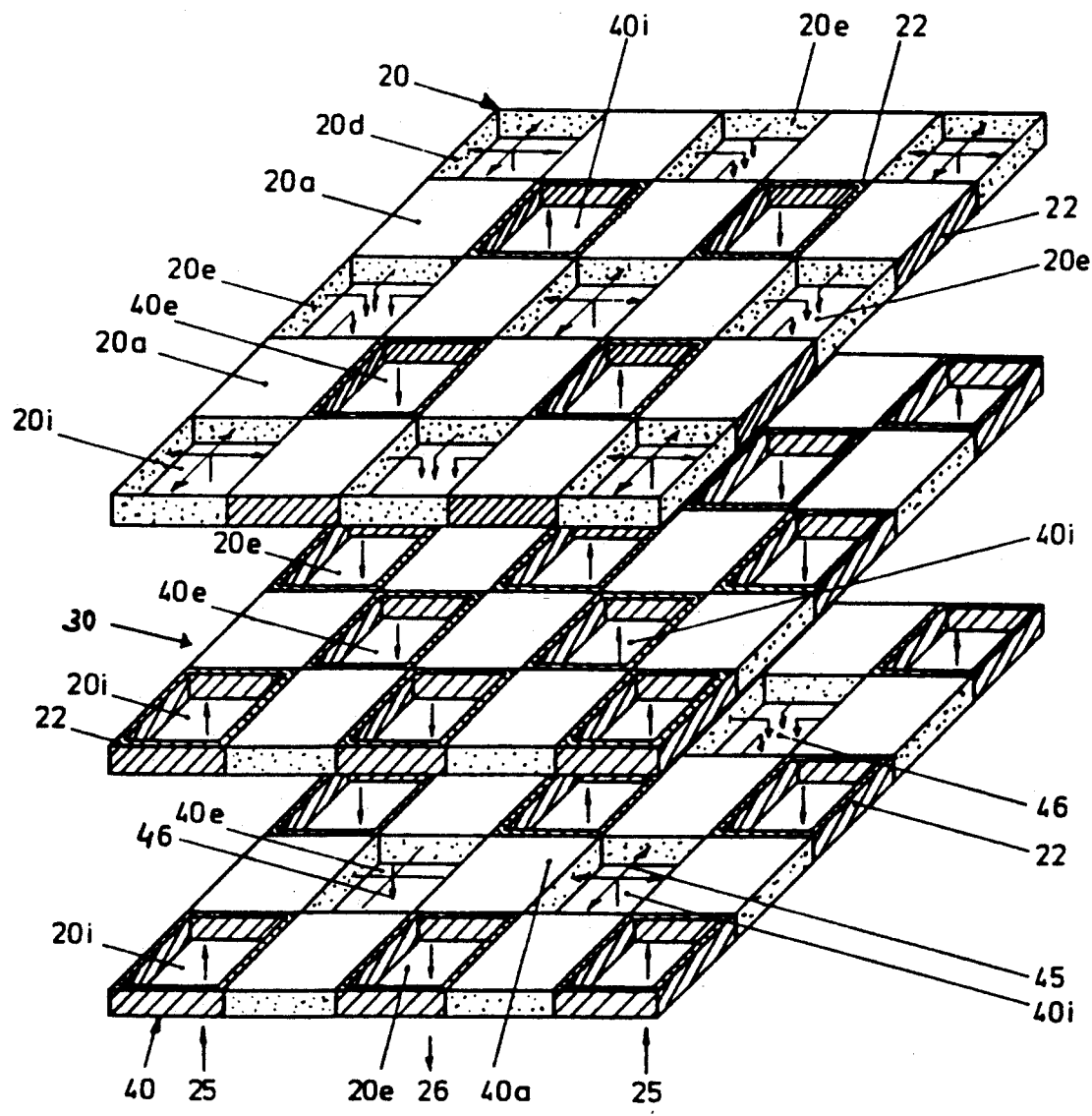
FIG. 3 is a perspectively view showing a section of a fuel cell comprising the anode and cathode sheet of FIG. 1 and FIG. 2.

FIGS. 1 & 2 are topviews showing a section of an anode sheet 20 (FIG. 1), and a section of a cathode sheet 40 (FIG. 2), each divided into a number of parallel subareas 1, 2, 3, ..., and provided with gas inlet channels 20$i$, 40$i$ for an anode process gas and a cathode process gas, respectively, and outlet channels 20$e$, 40$e$ for anode and cathode exhaust gas, respectively. The gas channels are, furthermore, distributed, so that each second subarea 1, 3, 5 ... is provided with alternating series each of an inlet channel 20$i$, an outlet channel 20$e$ and an inlet channel 20$i$ for anode process gas with interjacent anode active layers 20$a$ (FIG. 1) or cathode active layers 40$a$ (FIG. 2). The order of inlet and outlet channels 20$i$, 20$e$, 20$i$, ..., alternates in each of subareas 1, 3, 5, ..., so that an inlet channel 20$i$ in subarea 1, corresponds to an outlet channel 20$e$ in subarea 3, and to an inlet channel 20$i$ in subarea 5, etc.

In FIG. 1, the inlet channels 40$i$ for cathode process gas and outlet channels 40$e$ for cathode exhaust gas are disposed within interjacent subareas 2, 4, ..., and separated from the anode active layers by gas tight edge-stripes 22, which surround these channels. Channels 40$i$ and 40$e$ are arranged intermediate to channels in adjacent subareas.

The order of the inlet channels 40$i$ and outlet channels 40$e$ alternates in each of subareas 2, 4, ..., such as cathode exhaust gas outlet channels 40$e$ are arranged intermediate to anode process gas inlet channels 20$i$ and anode exhaust gas outlet channels 20$e$, in the adjacent subarea 1, 3, 5, ..., and cathode process gas inlet channels 40$i$ are arranged intermediate to anode exhaust gas outlet channels 20$e$ and anode process gas inlet channels 20$i$ in subareas 1, 3, 5, ...

The cathode sheet 40, shown in FIG. 2, is constructed similarly to the anode sheet 20 (FIG. 1), except for inlet channels 20$i$ for anode process gas and outlet channels 20$e$ for anode exhaust gas, which in sheet 40 are separated from the surrounding cathode active layers 40$a$ by gastight edge-stripes 22.

FIG. 3 shows perspectively a section of a fuel cell consisting of an anode sheet 20 and a cathode sheet 40 as described above. An electrolyte membrane 30 being provided with corresponding inlet and outlet channels is sandwiched between sheets 20 and 40. The electrode sheets and the electrolyte membrane are collected, so that the inlet and outlet channels in the sheets and the membrane are connected to their corresponding channels in the subsequent sheet and membrane. As shown in the Figure, anode process gas 25, flows through anode layers 20$a$ in anode sheet 20, after having passed through anode processgas inlet channels 20$i$ arranged in cathode sheet 40 and in electrolyte membrane 30. The anode active layers 20$a$ are confined on to sides by gastight stripes 22, surrounding inlet and outlet channels 40$i$ and 40$e$. Reacted anode processgas is withdrawn from the anode active layers via anode exhaust gas outlet channels 20$e$ through anode sheet 20, and through electrolyte membrane 30 and cathode sheet 40.

Similarly, cathode reactant gas 45 flows in cathode sheet 40 through cathode active layers 40$a$ and is withdrawn as cathode exhaust gas 46 through cathode exhaust gas outlet channels 40$e$. The cathode layers 40$a$ in sheet 40 are as in the anode layers 20$a$ in sheet 20 separated from the anode inlet channels and anode outlet channels 20$i$ and 20$e$ by gastight edge-stripes 22.

The intermediate electrolyte membrane 30 is separated from all gas channels 20$i$, 20$e$, 40$i$, 40$e$ through the membrane, by gastight edge-stripes 22.

Figure 4:
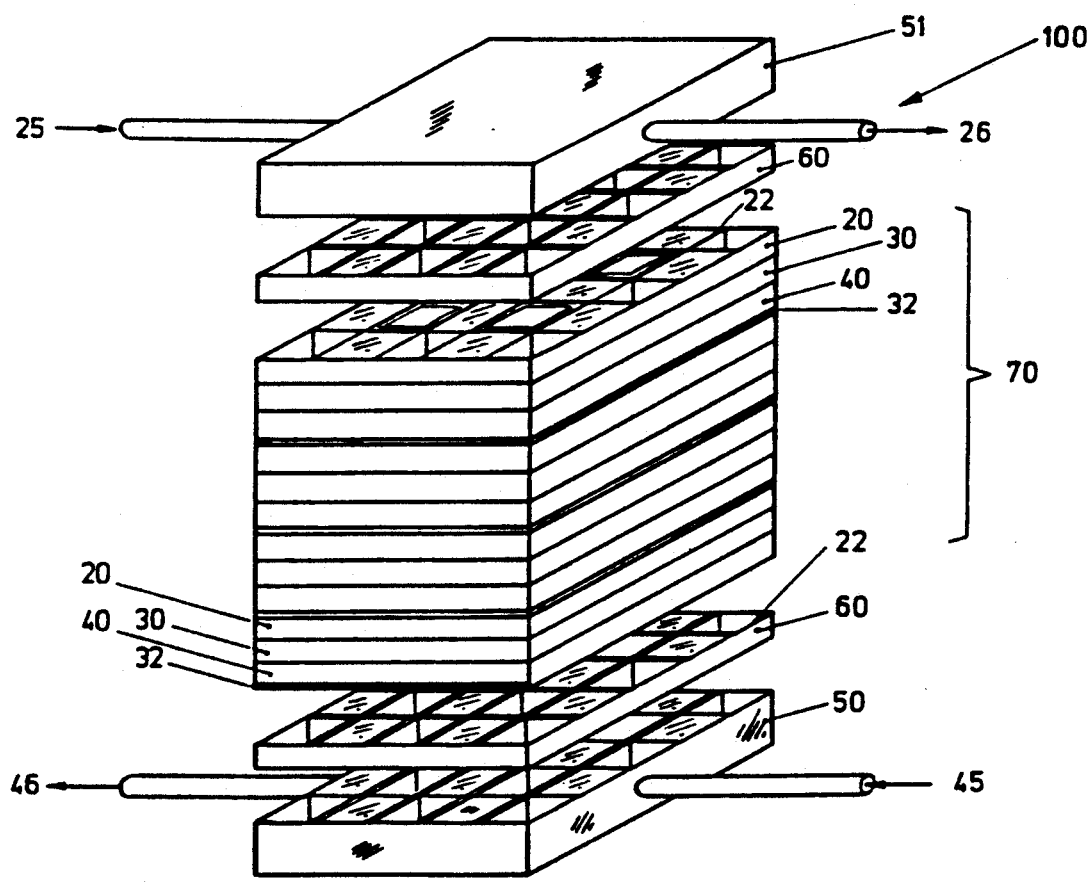
FIG. 4 is a perspective view of a fuel cell stack comprising a number of the fuel cells shown in FIG. 3.

A number of fuel cells shown in FIG. 3 may advantageously be piled to a fuel cell stack, which is shown in FIG. 4.

Fuel cell stack 100 has gasmanifolding blocks 50 and 51, by which the stack is supplied with cathode reactant gas 45 and anode process gas 25, respectively.

Stack 100 consists, furthermore, of a number of fuel cells 70, each composed of an anode sheet 20 and a cathode sheet 40 with intermediate electrolyte membrane 30 and constructed and collected as described above. An electricity conducting foil 32 is disposed between each single cell.

Electricity, which is produced in cells 70 by electrochemical reaction of process gases 25 and 45 is collected in current collector plates 60 arranged on the upper and lower part of the cell stack 100.

By providing each component of the stack with the above described pattern of holes, channelsare provided running vertically through each single cell 70 and through the collector sheets 60, and consequently, vertically throughout the stack 100, by which the cells are supplied with process gases 25 and 45.

I claim:

1. A fuel cell comprising an electrolyte membrane sandwiched between two electrode sheets, wherein
   a fuel cell comprising an electrolyte membrane sandwiched between a first and second electrode sheet, wherein
   the first electrode sheet being divided into a number of parallel subareas, in which any second subarea being provided in alternating order with at least an inlet channel and an outlet channel for a first reactant gas through the sheet and with a first electrode active porous layer intermediate to those channels, and any interjacent subarea, in alternating order with at least an inlet channel and at least an outlet channel for a second reactant gas through the sheet and with the first electrode active porous layer intermediate to those channels, the inlet and outlet channels for the second reactant gas being confined against the first electrode active layers by gas impermeable edge-stripes;
   the second electrode sheet being divided into a number of parallel subareas in which any second subarea being provided in alternating order with at least an inlet channel and an outlet channel for the first reactant gas through the sheet and with a second electrode active porous layer intermediate to those channels, and any interjacent subarea, in alternating order with at least an inlet channel and at least an outlet channel for the second reactant gas through the sheet and with the second electrode active porous layer intermediate to those channels, the inlet and outlet channels for the first reactant gas being confined against the second electrode active layers by gas impermeable edge-stripes; and the electrolyte membrane being provided with inlet and outlet channels corresponding with compatible channels through the first and second electrode sheet.

2. The fuel cell claim 1, wherein the first and second electrode active layer consists of a number of sublayers, at least one of the sublayers having coarse pores, with a pore diameter wider than $10\mu$.

3. The fuel cell of claim 1, wherein the electrolyte membrane consists of one or more layers of porous material.

4. The fuel cell of claim 1, wherein all channels through the electrolyte membrane are confined by impermeable edge-stripes.

5. A fuel cell stack comprising at least two fuel cells according to claim 1 and a gastight electricity conducting barrier between each cell, the barrier is provided with inlet and outlet channels, corresponding with compatible channels through the cells.

6. The fuel cell stack of claim 5, wherein the gastight electric conducting barrier is a metallic foil.

7. The fuel cell stack of claim 6, wherein the gastight electric conducting barrier is supplied directly on the electrode sheets.

* * * * *